United States Patent
Ezawa et al.

(10) Patent No.: US 8,605,273 B2
(45) Date of Patent: Dec. 10, 2013

(54) SOLAR LIGHT TRACKING SENSOR DIRECTION SETTING/MEASURING/RE-ADJUSTING METHOD AND SOLAR LIGHT COLLECTING DEVICE

(75) Inventors: Kazuaki Ezawa, Tokyo (JP); Kounosuke Oku, Tokyo (JP); Kazumasa Fujiwara, Tamano (JP); Takashi Kawaguchi, Tokyo (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 915 days.

(21) Appl. No.: 12/733,802

(22) PCT Filed: Oct. 30, 2008

(86) PCT No.: PCT/JP2008/069725
§ 371 (c)(1),
(2), (4) Date: Mar. 19, 2010

(87) PCT Pub. No.: WO2009/057677
PCT Pub. Date: May 7, 2009

(65) Prior Publication Data
US 2010/0243031 A1 Sep. 30, 2010

(30) Foreign Application Priority Data
Oct. 31, 2007 (JP) .................................. 2007-284110

(51) Int. Cl.
*G01B 11/26* (2006.01)

(52) U.S. Cl.
USPC .................................. 356/139.01; 356/139.1

(58) Field of Classification Search
USPC ............... 356/3.01–3.15, 4.01–4.1, 5.1–5.15, 356/6–22, 28, 28.5, 139.01–139.1
See application file for complete search history.

(56) References Cited

U.S. PATENT DOCUMENTS

| | | | |
|---|---|---|---|
| 4,146,784 A | 3/1979 | Yekutieli | |
| 4,172,443 A | 10/1979 | Sommer | |
| 4,227,513 A | 10/1980 | Blake et al. | |
| 4,791,533 A | 12/1988 | Hane | |
| 6,324,024 B1 * | 11/2001 | Shirai et al. | 359/884 |
| 6,899,096 B2 | 5/2005 | Nakamura | |
| 2002/0063859 A1 | 5/2002 | Hermann | |
| 2005/0279953 A1 * | 12/2005 | Gerst | 250/548 |

FOREIGN PATENT DOCUMENTS

| | | | |
|---|---|---|---|
| EP | 0251162 A2 | 1/1988 | |
| JP | 57120808 A | 7/1982 | |
| JP | 57120809 A | 7/1982 | |

(Continued)

*Primary Examiner* — Luke Ratcliffe
(74) *Attorney, Agent, or Firm* — Westerman, Hattori, Daniels & Adrian, LLP

(57) ABSTRACT

The direction of a solar light tracking sensor is set easily with high accuracy. A solar light tracking guide (35) is installed on the optical axis (11) of the reflected light collected by a heliostat (2). An optical telescope (47) is so attached to the rear end part of the guide (35) as to be aligned with the guide axis (C) of the guide (35). The posture of the solar light tracking guide (35) is so adjusted that a cross provided in the field of view of the telescope (47) agrees with the center (10*a*) of the light collection target position and fixed to the base (38). Then, a solar light tracking sensor (12) is fastened to the rear end part of the guide (35) in place of the optical telescope (47).

3 Claims, 5 Drawing Sheets

(56) References Cited

FOREIGN PATENT DOCUMENTS

| | | | |
|---|---|---|---|
| JP | 60023753 A | | 2/1985 |
| JP | 63023606 U | | 2/1988 |
| JP | 6021012 U | | 3/1994 |
| JP | 2003130589 A | | 5/2003 |
| JP | 2004333003 A | | 11/2004 |

* cited by examiner

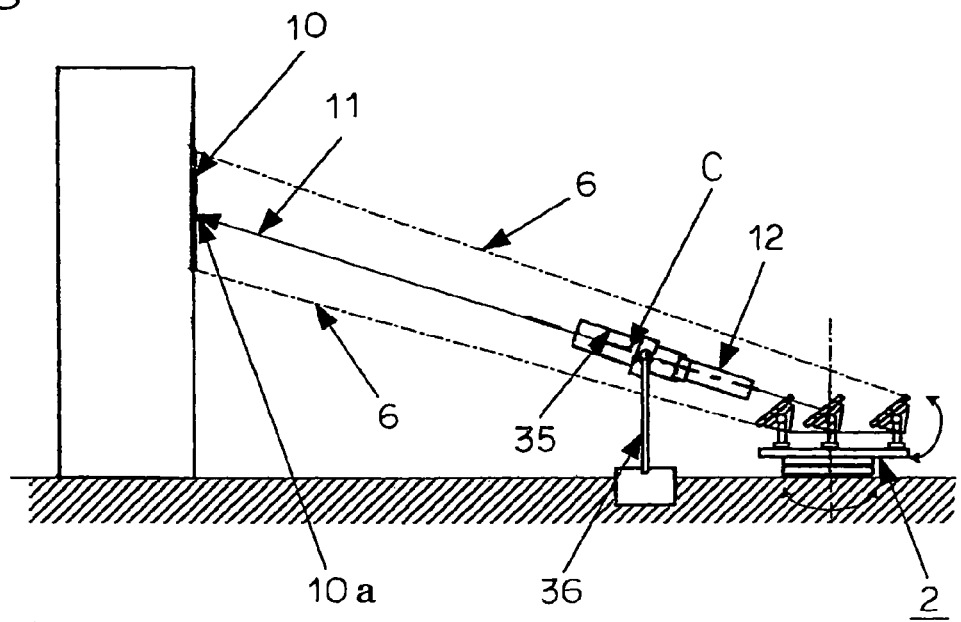
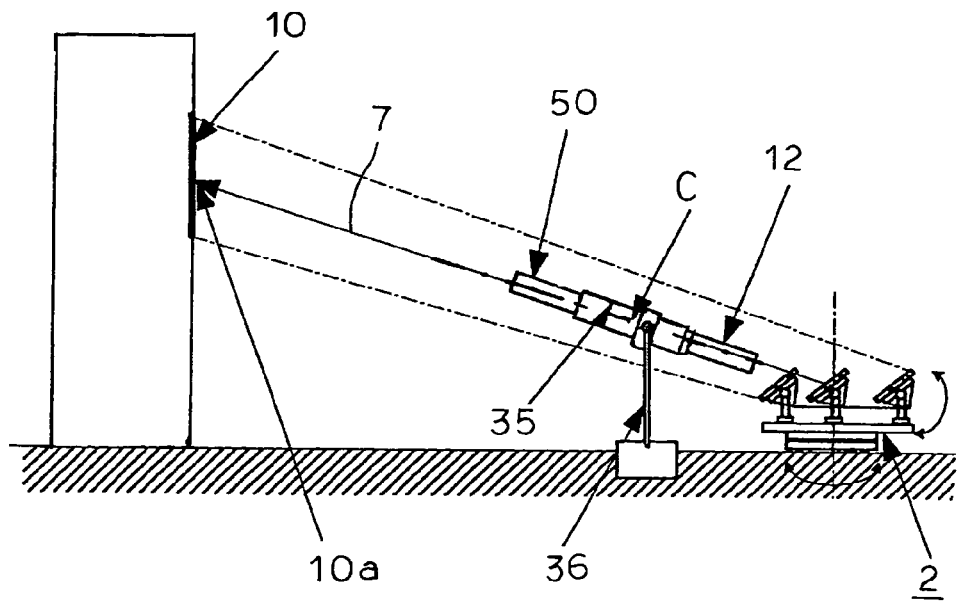

000000# SOLAR LIGHT TRACKING SENSOR DIRECTION SETTING/MEASURING/RE-ADJUSTING METHOD AND SOLAR LIGHT COLLECTING DEVICE

This is a national stage of PCT/JP08/069,725 filed Oct. 30, 2008 and published in Japanese, which has a priority of Japanese no. 2007-284110 filed Oct. 31, 2007, hereby incorporated by reference.

TECHNICAL FIELD

The present invention relates to a direction setting method, an optical axis displacement measuring method, and a re-adjusting method of a solar light tracking sensor, and to a solar light collecting device.

As a solar light collecting device applied to a solar thermal power generation device, conventionally, three types of light collecting devices are known: a trough type (distributed type) light collecting device; a tower type (light collecting type) light collecting device; and a dish type light collecting device.

The trough type light collecting device collects solar light by a parabolic curved mirror and heats a pipe (heat collecting pipe) filled with liquid (heat medium). Although the trough type light collecting device has a design easy to be changed in accordance with the size of installation site, an amount of collected solar light is smaller than that of the tower type light collecting device, and hence the temperature is not so high that high efficiency cannot be expected.

The tower type light collecting device collects solar light reflected by flat mirrors arranged on the ground to a central tower and heats a pipe (heat collecting pipe) filled with liquid (heat medium). Although the tower type light collecting device occupies a huge area to install heliostats, an amount of collected solar light is great, and accordingly it is possible to heat the heat medium to high temperature. Therefore, although the tower type light collecting device can generate electric power with high efficiency compared with other light collecting devices, the tower type light collecting device is not profitable unless it is large-scale.

The dish type light collecting device collects solar light reflected by a curved mirror (dish) having a shape like a parabola antenna to a central receiver, and generates electric power by a Stirling engine (external-combustion engine using pressure from temperature difference of air) or the like. Although the dish type light collecting device can reduce the size of plant, the dish type light collecting device is still in an initial stage of research and development.

Since, as described above, conventional solar light collecting devices have both advantages and disadvantages, or are in a stage of research and development, a beam down type light collecting device is newly proposed. As shown in FIG. 9, the beam down type light collecting device collects reflected light 3 from a plurality of heliostats 2 arranged on the ground 1 concentrically to upper part of a tower (not shown in the figure), and further reflects the reflected light 3 by a second reflecting mirror 4 to guide it to the ground.

Regarding the reflecting mirror provided at the upper part of the tower, there are a system using a convex mirror (hyperboloid mirror) which is being developed by the Weizmann Institute of Science in Israel and a system using a concave mirror (elliptical mirror) which is being developed by Research Center for Carbon Recycling Energy, Tokyo Institute of Technology, and both systems can be used. In this way, there are advantages that a heat medium such as molten salt need not be circulated to the upper part of the tower and a receiver for absorbing solar heat need not be mounted on the upper part of the tower.

The solar light guided to the ground is further collected by a secondary light collector 5 called CPC (Compound Parabolic Concentrator), and used to heat molten salt. The plant can be operated 24 hours a day by heat storage of molten salt.

When installing a solar light tracking sensor for controlling the posture of a heliostat, conventionally, as shown in FIGS. 10 and 11, first, the optical axis 11 of the light collection target position 10 is determined, and thereafter, the solar light tracking sensor 12 is attached by three-dimensionally adjusting the direction of the solar light tracking sensor 12 with respect to the optical axis 11. In the figures, reference numeral 2 denotes the heliostat, reference numeral 13 denotes a solar light tracking sensor installation mount, and reference symbol S denotes the sun.

Specifically, in a conventional manner, as shown in FIG. 12, a method is employed in which a measuring device (for example, a transit or the like) 14 is mounted on the collection target optical axis 11, and further a "mark" is attached on necessary points, for example, the center 15 of the light collection target 10, the center 16 of the front end of the solar light tracking sensor 12, the center 17 of the rear end of the solar light tracking sensor 12, and the center 18 of the heliostat 2, and the solar light tracking sensor 12 is installed so that the sensor axis (not shown in the figure) of the solar light tracking sensor 12 agrees with each mark by looking into the transit 14 with the naked eye M.

As described above, in the conventional center installation method, the sensor attaching position is determined by measurement, however it is difficult to accurately set the solar light tracking sensor 12 to the sensor attaching position on which the "marks" are attached by measurement.

Even when the solar light tracking sensor is accurately attached by the above method, deviation (displacement) occurs in the target optical axis due to external disturbances (for example, wind, heat, vibration, and the like), and, as a result, deviation occurs in the light collection performance, or the light collection performance deteriorates. In addition, to measure the amount of the displacement, a lot of work is required. For example, to identify which device of a large number of heliostats is displaced, all the devices need to be checked.

When a displacement occurs between the sensor axis of the solar light tracking sensor and the target optical axis, positions of various devices need to be measured precisely and the devices need to be fine adjusted. Therefore, these operations are desired to be improved.

Furthermore, as shown in FIG. 13, when collecting light via a plurality of mirrors, positions and directions of the heliostat 2 and a second reflecting mirror 20 need to be adjusted, so that the adjustment and measurement operations require several times the work of adjustment and measurement in a case of a single reflecting mirror. In addition, in the conventional manner, a displacement of the solar light tracking sensor and a displacement of the second reflecting mirror need to be measured separately. In the figure, reference symbol N denotes a solar light irradiated surface.

In the conventional manner, as shown in FIGS. 10 and 11, since the solar light tracking sensor installation mount 13 is mounted on a heliostat installation base 21, a notch 22 for avoiding interference between the heliostat 2 and the solar light tracking sensor installation mount 13 needs to be provided in the surface of the heliostat 2, so that the area of the heliostat 2 is reduced.

Although, in the related art of the solar light collecting device, many inventions have been made (for example, refer to Patent Documents 1 and 2), there appears to be no invention similar to the present invention.

Patent Document 1: Japanese patent application Kokai publication No. 2004-333003
Patent Document 2: Japanese utility model Kokai publication No. 05-24165

DISCLOSURE OF THE INVENTION

Problems to be Solved by the Invention

The present invention has been made to solve the above problems, and a first object of the present invention is to provide a solar light tracking sensor direction setting method by which the solar light tracking sensor can be installed with ease and a high degree of accuracy.

A second object of the present invention is to provide a solar light tracking sensor optical axis displacement measuring method by which the solar light tracking sensor optical axis displacement over time can be measured with ease and a high degree of accuracy.

A third object of the present invention is to provide a solar light tracking sensor re-adjusting method by which the solar light tracking sensor optical axis displacement over time can be re-adjusted with ease and a high degree of accuracy.

A fourth object of the present invention is to provide a solar light collecting device which can avoid a reduction of the area of heliostat resulted from the solar light tracking sensor installation mount.

A solar light tracking sensor direction setting method according to a first embodiment of the invention is characterized by comprising the steps of, installing a solar light tracking sensor on an optical axis of reflected light collected by a heliostat, installing a solar light tracking guide on said optical axis to automatically control posture of the heliostat by the solar light tracking sensor, attaching an optical telescope to the rear end part of the solar light tracking guide so as to be aligned with a guide axis of the solar light tracking guide, adjusting the posture of said solar light tracking guide so that a cross provided in a field of view of the optical telescope agrees with the center of a light collection target position and fixing said solar light tracking guide to an installation base, and removing the optical telescope from the solar light tracking guide and attaching the solar light tracking sensor to the rear end part of the solar light tracking guide so as to be aligned with the guide axis of the solar light tracking guide.

A solar light tracking sensor optical axis displacement measuring method according to a second embodiment of the invention is characterized by comprising the steps of, installing a solar light tracking sensor on an optical axis of reflected light collected by a heliostat, attaching a laser light oscillator to the front end part of the solar light tracking guide to which said solar light tracking sensor is attached so as to be aligned with a guide axis of the solar light tracking guide, to automatically control posture of the heliostat by the solar light tracking sensor when a solar light tracking sensor optical axis displacement over time occurs, marking a light collection target position by oscillating laser light with the laser light oscillator, and measuring an amount of displacement of the marking point from said optical axis.

A solar light tracking sensor re-adjusting method according to a third embodiment of the invention is characterized by comprising the steps of, installing a solar light tracking sensor on an optical axis of reflected light collected by a heliostat, attaching a laser light oscillator to the front end part of the solar light tracking guide to which said solar light tracking sensor is attached so as to be aligned with a guide axis of the solar light tracking guide, to automatically control posture of the heliostat by the solar light tracking sensor when a solar light tracking sensor optical axis displacement over time occurs, marking a light collection target position by oscillating laser light with the laser light oscillator, and re-adjusting posture of said solar light tracking guide so that the marking point agrees with the center of said light collection target position.

A solar light collecting device for use in the method according to the invention is characterized by having a solar light tracking sensor installed on an optical axis of reflected light collected by a heliostat, and automatically controlling posture of the heliostat by the solar light tracking sensor, wherein a solar light tracking sensor installation mount for supporting said solar light tracking sensor is separated from a heliostat installation base and is installed outside of the heliostat installation base system.

Advantages of the Invention

Since the invention according to the first embodiment comprises the steps of, installing a solar light tracking sensor on an optical axis of reflected light collected by a heliostat, installing a solar light tracking guide on said optical axis to automatically control posture of the heliostat by the solar light tracking sensor, attaching an optical telescope to the rear end part of the solar light tracking guide so as to be aligned with a guide axis of the solar light tracking guide, adjusting the posture of said solar light tracking guide so that a cross provided in a field of view of the optical telescope agrees with the center of a light collection target position and fixing said solar light tracking guide to an installation base, and removing the optical telescope from the solar light tracking guide and attaching the solar light tracking sensor to the rear end part of the solar light tracking guide so as to be aligned with the guide axis of the solar light tracking guide, it is not necessary to mount the solar light tracking guide on the optical axis by using a transit or the like as in the conventional manner, and it is possible to install the solar light tracking sensor on the optical axis with ease and a high degree of accuracy compared with the conventional way.

Since the invention according to the second embodiment comprises the steps of, installing a solar light tracking sensor on an optical axis of reflected light collected by a heliostat, attaching a laser light oscillator to the front end part of the solar light tracking guide to which said solar light tracking sensor is attached so as to be aligned with a guide axis of the solar light tracking guide, to automatically control posture of the heliostat by the solar light tracking sensor when a solar light tracking sensor optical axis displacement over time occurs, marking a light collection target position by oscillating laser light with the laser light oscillator, and measuring an amount of displacement of the marking point from said optical axis, it is possible to measure the solar light tracking sensor optical axis displacement with ease and a high degree of accuracy without requiring a large amount of labor.

Since the invention according to the third embodiment comprises the steps of, installing a solar light tracking sensor on an optical axis of reflected light collected by a heliostat, attaching a laser light oscillator to the front end part of the solar light tracking guide to which said solar light tracking sensor is attached so as to be aligned with a guide axis of the solar light tracking guide, to automatically control posture of the heliostat by the solar light tracking sensor when a solar light tracking sensor optical axis displacement over time occurs, marking a light collection target position by oscillating laser light with the laser light oscillator, and re-adjusting posture of said solar light tracking guide so that the marking point agrees with the center of said light collection target position, it is possible to re-adjust the solar light tracking sensor optical axis displacement overtime with ease and a high degree of accuracy.

Since the device for use in the method according to the invention has a solar light tracking sensor installed on an optical axis of reflected light collected by a heliostat, and automatically controlling posture of the heliostat by the solar light tracking sensor, wherein a solar light tracking sensor installation mount for supporting said solar light tracking sensor is separated from a heliostat installation base and is installed outside of the heliostat installation base system, it is possible to avoid interference between the heliostat and the solar light tracking sensor installation mount, so that it is possible to avoid a reduction of the area of heliostat resulted from the solar light tracking sensor installation position. In addition, according to this invention, since the solar light tracking sensor installation mount is separated from the heliostat installation base, it is possible to easily adjust the solar light tracking sensor installation position.

BRIEF DESCRIPTION OF THE DRAWINGS

FIG. 6 is a side view showing an installation method of a solar light tracking sensor.

FIG. 7 is a side view showing an installation method of a laser light oscillator.

DESCRIPTION OF SYMBOLS

Figure 1:
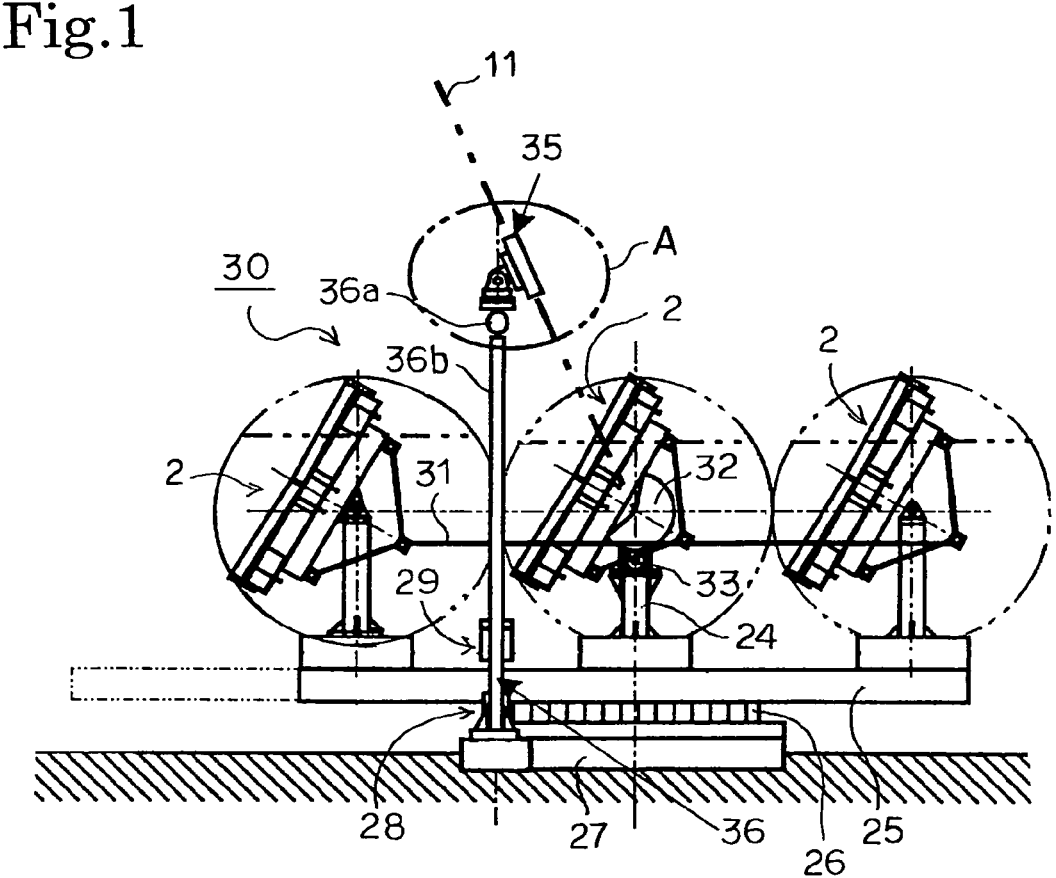
FIG. 1 is a side view of a solar light collecting device according to the present invention.

2 Heliostat
10a Center position of light collection target position
11 Optical axis
12 Solar light tracking sensor
35 Solar light tracking guide
38 Installation base
47 Optical telescope
C Guide axis of solar light tracking guide

DESCRIPTION OF THE PREFERRED EMBODIMENT

Hereinafter, an embodiment of the present invention will be described with reference to the drawings.

Although FIG. 1 shows flat type heliostats, the embodiment can also be applied to T-bone type heliostats.

As shown in FIG. 1, in a solar light collecting device 30 related to the present invention, a plurality of heliostats for collecting solar light is set on a rotating table 25 via heliostat bases 24. Although, a mirror attached to the heliostat 2 is essentially desired to be manufactured to have a three-dimensional curved surface with conic curve, in fact, small mirrors (facets) are combined to form a virtual conic curve, because of the high manufacturing cost and difficulty in maintaining accuracy of the three-dimensional curved surface with conic curve.

The rotating table 25 is rotated clockwise or counterclockwise along with a large gear wheel 26 provided on the bottom surface of the rotating table 25. The large gear wheel 26 fixed to the bottom surface of the rotating table 25 is rotatably mounted on a fixed plate 27. A small gear wheel 28 engaged with the large gear wheel 26 is driven by an electric motor 29 installed on the rotating table 25.

A plurality of heliostats 2 is connected to one another by a connection link 31, and caused to simultaneously look up or look down. The looking up or looking down of the heliostat 2 is performed by an engagement between a gear wheel 32 having a circular arc shape attached to the back surface of the heliostat 2 and a pinion 33 mounted on the heliostat base 24.

The solar light tracking guide 35 is located obliquely upward of the central heliostat 2, and mounted so that the axis of the solar light tracking guide 35 is aligned with a set optical axis 11. The solar light tracking guide 35 is located at the center of a horizontal frame 36a of a solar light tracking sensor installation mount 36 formed in a gate shape. Therefore, the position of solar light tracking guide 35 is easy to be adjusted in the left-right direction along the horizontal frame 36a. Support posts 36b of both sides of the solar light tracking sensor installation mount 36 are placed upright at both sides of the rotating table 25.

Figure 2:
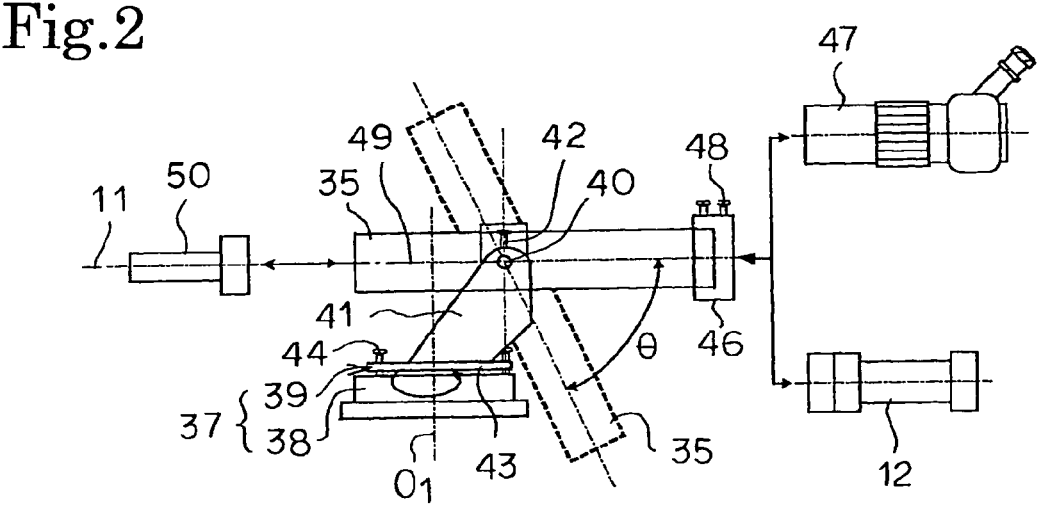
FIG. 2 is a diagram illustrating a relationship between a solar light tracking guide in part A of FIG. 1 and various devices attached to the guide.

As shown in FIG. 2, the solar light tracking guide 35 is a cylindrical body having a predetermined length and mounted on a solar light tracking guide installation mount 37. The solar light tracking guide installation mount 37 is formed by an installation base 38 and a support body 39 rotatably mounted on the installation base 38. Reference symbol $O_1$ denotes a rotation center axis of the support body 39, and the rotation center axis $O_1$ is perpendicular to the installation base 38.

Although the solar light tracking guide 35 is installed in the support body 39 so as to be able to look up and look down via cantilever shafts 40 provided on both sides of the solar light tracking guide 35, the solar light tracking guide 35 can be fixed to have a predetermined angle of attack θ by fastening a fastening member 42 such as a bolt provided on a bracket 41 of the support body 39. In addition, the support body 39 can be fixed to have a predetermined rotation angle around the rotation center axis $O_1$ by fastening a fastening member 44 such as a bolt provided around a rotation plate 43.

The solar light tracking guide 35 has a connection member 46 having a boss shape at the rear end thereof. The connection member 46 is for attaching the solar light tracking sensor 12 and an optical telescope (for example, spotting scope) 47, and can be fixed so that the axis of the solar light tracking sensor 12 or the spotting scope 47 is aligned with the guide axis 49 of the solar light tracking guide 35 by a fastening member 48 such as a bolt provided around the connection member 46. On the other hand, at the top end part of the solar light tracking guide 35, a laser light oscillator 50 can be attached.

Next, the direction setting method, the measuring method, and the re-adjusting method of the solar light tracking sensor of the present invention will be described.

(A) Direction Setting Method of the Solar Light Tracking Sensor

Figure 3:
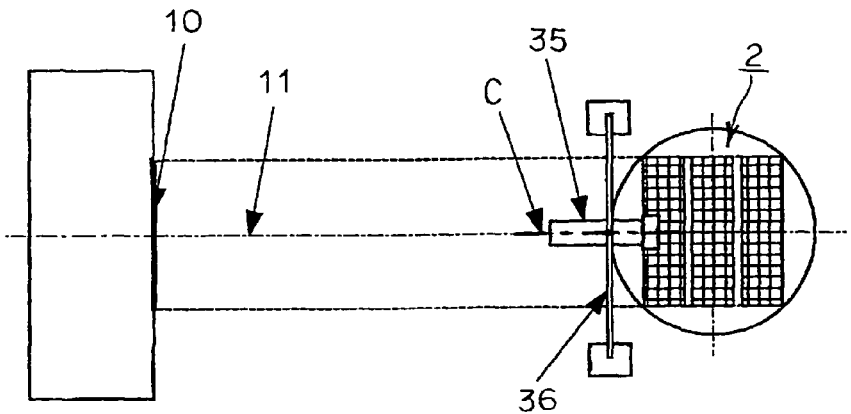
FIG. 3 is a plan view showing an installation method of the solar light tracking guide.

When installing a solar light tracking sensor on an optical axis of a light flux collected by a heliostat, as shown in FIG. 3, first, the solar light tracking guide 35 is installed in a predetermined position in the solar light tracking sensor installation mount 36 so that the guide axis C of the solar light tracking guide 35 is located on the optical axis 11.

Figure 4:
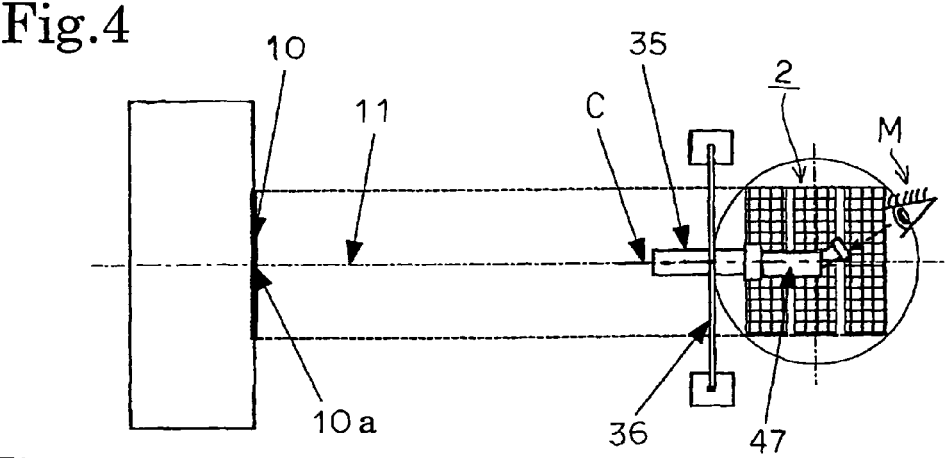
FIG. 4 is a plan view showing an adjusting method of the solar light tracking guide.
Figure 5:
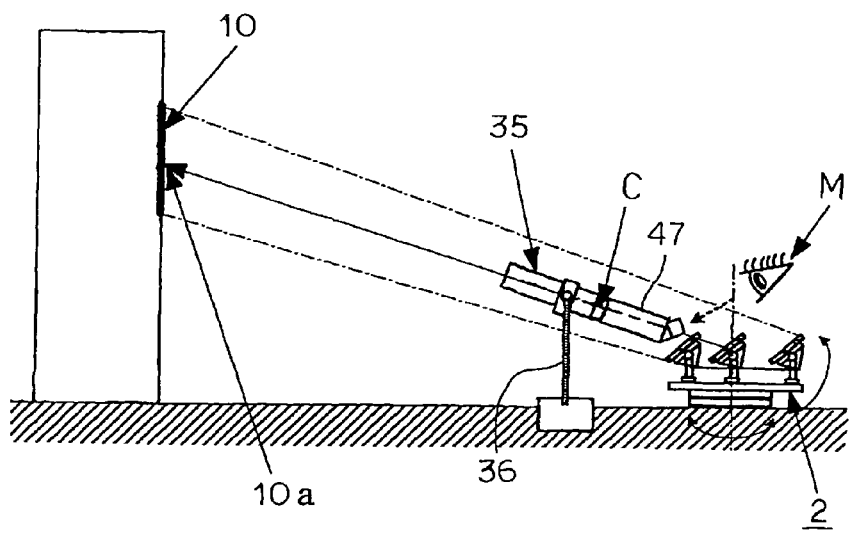
FIG. 5 is a side view showing the adjusting method of the solar light tracking guide.

Next, as shown in FIGS. 4 and 5, the optical telescope 47 is attached to the rear end part of the solar light tracking guide 35 so that the axis of the optical telescope 47 is aligned with the guide axis C of the solar light tracking guide 35. The posture of the solar light tracking guide 35 is fine-adjusted so that a + mark (a cross mark) provided in a field of view of the optical telescope 47 agrees with the center position 10*a* of the light collection target position 10 by looking into the optical telescope 47 with the naked eye, and the solar light tracking guide 35 is fixed to the above described installation base (refer to FIG. 2).

Thereafter, the optical telescope 47 is removed from the solar light tracking guide 35, and in place of the optical telescope 47, the solar light tracking sensor 12 is attached to the rear end part of the solar light tracking guide 35 so that the axis of the solar light tracking sensor 12 is aligned with the guide axis C of the solar light tracking guide 35 (refer to FIG. 6).

Thereafter, the direction of the heliostat 2 is computer-controlled by the solar light tracking sensor 12 so that the optical axis 11 of the light flux 6 collected by the heliostat 2 is aligned with the guide axis C of the solar light tracking guide 35.

(B) Optical Axis Displacement Measuring Method and Re-Adjusting Method of the Solar Light Tracking Sensor When a solar light tracking sensor optical axis displacement over time occurs after several years or decades have passed since installation, as shown in FIG. 7, the laser light oscillator 50 is attached to the front end part of the solar light tracking guide 35 to which the solar light tracking sensor 12 is attached so that the axis of the laser light oscillator 50 is aligned with the guide axis C of the solar light tracking guide 35.

Figure 8:
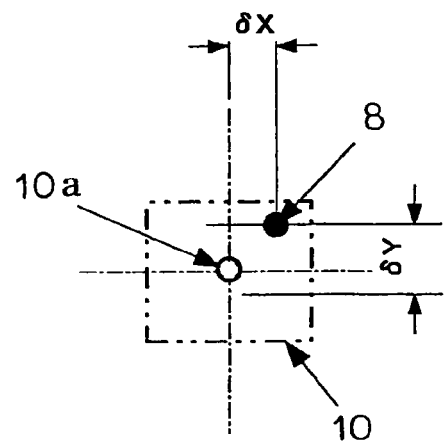
FIG. 8 is a front view showing a measuring method for measuring an amount of a marking point displacement.
Figure 9:
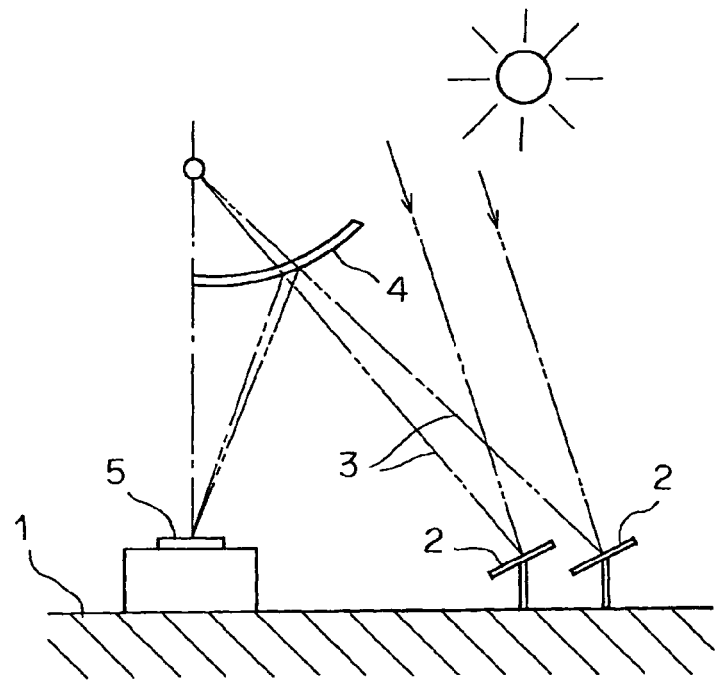
FIG. 9 is an explanatory diagram illustrating a down beam type solar electric power generation system.
Figure 10:
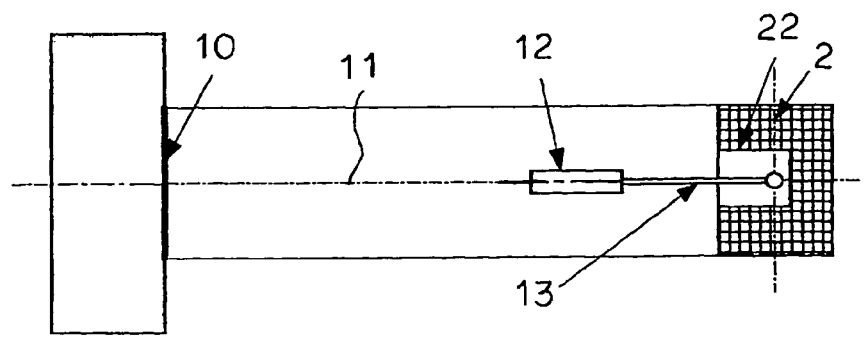
FIG. 10 is a plan view of a conventional solar light collecting device.
Figure 11:
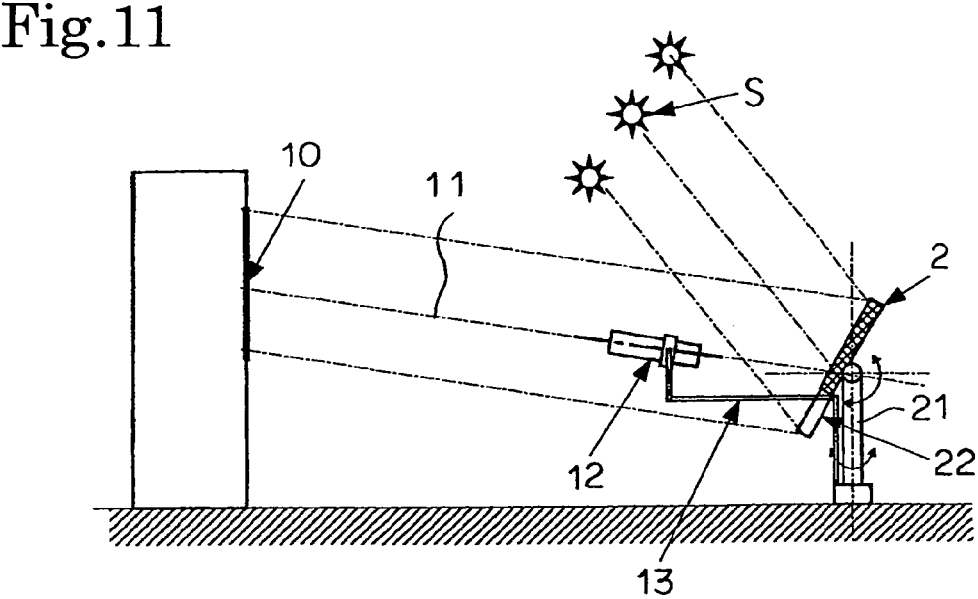
FIG. 11 is a side view of the conventional solar light collecting device.
Figure 12:
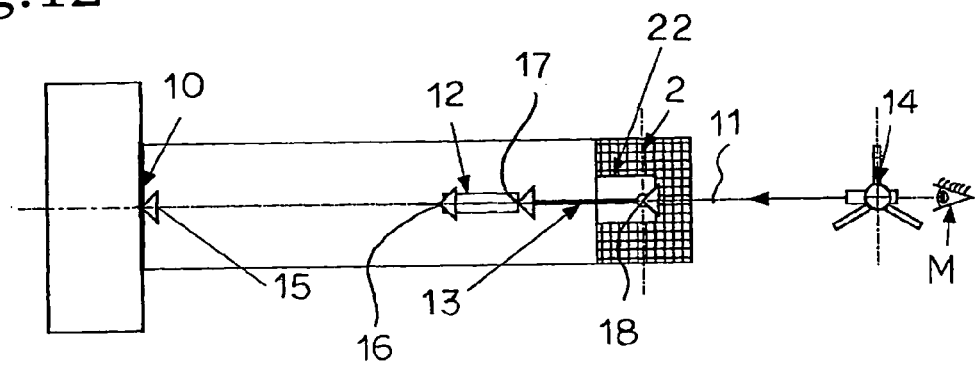
FIG. 12 is an explanatory diagram illustrating an installation method of a conventional solar light tracking sensor.
Figure 13:
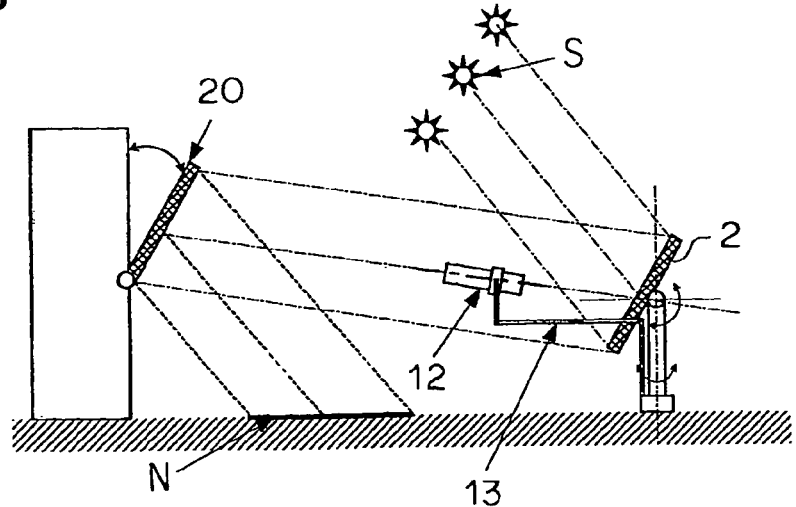
FIG. 13 is an explanatory diagram showing difficulty in an installation operation or the like when including a second reflecting mirror.

Thereafter, laser light 7 is oscillated with the laser light oscillator 50 to mark the light collection target position 10 as shown in FIG. 8, and an amount of displacement of the marking point 8 (for example, an amount of displacement of the marking point 8, δx, δy) from the optical axis 11 (for example, the center position 10*a* of the light collection target position 10) is measured in the light collection target position 10. This measuring operation is performed at night without solar light.

Thereafter, the posture of the solar light tracking guide 35 is re-adjusted so that the marking point 8 agrees with the center position 10*a* of the light collection target position 10.

What is claimed is:

1. A method of setting a direction of a solar light tracking sensor when installing the solar light tracking sensor on an optical axis of reflected light collected by a heliostat, comprising the steps of:
    installing a cylindrical solar light tracking guide on said optical axis to automatically control the posture of the heliostat by the solar light tracking sensor;
    attaching an optical telescope to the rear end part of the solar light tracking guide so as to be aligned with a guide axis of the solar light tracking guide;
    adjusting the posture of said solar light tracking guide so that a cross provided in a field of view of the optical telescope agrees with the center of a light collection target position and fixing said solar light tracking guide to an installation base; and
    removing the optical telescope from the solar light tracking guide and in place of the optical telescope, attaching the solar light tracking sensor to the rear end part of the solar light tracking guide so as to be aligned with the guide axis of the solar light tracking guide.

2. A method of measuring displacement of an optical axis of a solar light tracking sensor from an optical axis of reflected light collected by a heliostat, in a solar light collecting device in which the solar light tracking sensor is installed on the optical axis of reflected light collected by the heliostat, a cylindrical solar light tracking guide is installed on the optical axis of reflected light collected by the heliostat, and the solar light tracking sensor is attached to the front end part of the solar light tracking guide, the method comprising the steps of:
    attaching a laser light oscillator to the front end part of the solar light tracking guide to which said solar light tracking sensor is attached so as to be aligned with a guide axis of the solar light tracking guide, to automatically control the posture of the heliostat by the solar light tracking sensor when a solar light tracking sensor optical axis displacement over time occurs;
    marking a light collection target position by oscillating laser light with the laser light oscillator; and
    measuring an amount of displacement of the marking point from said optical axis.

3. A method of re-adjusting a solar light tracking sensor in a solar light collecting device, in which the solar light tracking sensor is installed on the optical axis of reflected light collected by a heliostat, a cylindrical solar light tracking guide is installed on the optical axis of reflected light collected by the heliostat, and the solar light tracking sensor is attached to the front end part of the solar light tracking guide, the method comprising the steps of:
    attaching a laser light oscillator to the front end part of the solar light tracking guide to which said solar light tracking sensor is attached so as to be aligned with a guide axis of the solar light tracking guide, to automatically control the posture of the heliostat by the solar light tracking sensor when a solar light tracking sensor optical axis displacement over time occurs;
    marking a light collection target position by oscillating laser light with the laser light oscillator; and
    re-adjusting the posture of said solar light tracking guide so that the marking point agrees with the center of said light collection target position.

* * * * *